United States Patent
Kamperman et al.

(10) Patent No.: US 7,627,903 B2
(45) Date of Patent: Dec. 1, 2009

(54) CONNECTION LINKED RIGHTS PROTECTION

(75) Inventors: Franciscus Lucas Antonius Johannes Kamperman, Eindhoven (NL); Gerardus Cornelis Petrus Lokhoff, Eindhoven (NL); Feng Li, Shanghai (CN); Darwin He, Shanghai (CN); Wilhelmus Franciscus Johannes Fontijn, Eindhoven (NL); Steven Broeils Luitjens, Eindhoven (NL); Wenying You, Shanghai (CN); Gongming Wei, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 45 days.

(21) Appl. No.: 10/596,104

(22) PCT Filed: Nov. 19, 2004

(86) PCT No.: PCT/IB2004/052484
§ 371 (c)(1),
(2), (4) Date: May 31, 2006

(87) PCT Pub. No.: WO2005/055022
PCT Pub. Date: Jun. 16, 2005

(65) Prior Publication Data
US 2007/0162979 A1  Jul. 12, 2007

(30) Foreign Application Priority Data
Dec. 4, 2003  (EP) ................... 03104544

(51) Int. Cl.
*G06F 7/04* (2006.01)

(52) U.S. Cl. ........................................ 726/27
(58) Field of Classification Search ............ 726/27
See application file for complete search history.

(56) References Cited

U.S. PATENT DOCUMENTS 5,917,912 A   6/1999   Ginter et al.

(Continued)

FOREIGN PATENT DOCUMENTS

WO        0154091 A2    7/2001

(Continued)

OTHER PUBLICATIONS

S.A.F.A. Van Den Heuvel et al., "Secure content management in authorised domains", IBC Conference Publication, pp. 467-474, Sep. 2002.

*Primary Examiner*—Kambiz Zand
*Assistant Examiner*—Teshome Hailu (57) ABSTRACT

The present invention relates to a method and a system for performing digital rights management. The idea of the invention is that a master right associated with a content is stored at a first authorized device (211). An authorized device is a device which can be considered trusted and performs actions with contents according to the associated rights. These devices enforce rights that are bound to contents, and perform the security tasks of the DRM system employed. A subright is derived from the master right, which subright controls what type of access a second authorized device (261) is given to the associated content. Finally, the subright is distributed to the second authorized device, given that the second device complies with predetermined distribution criteria associated with the master right. The device distributing the subright authenticates the device which is to receive the subright, ensuring that the second device can be trusted.

27 Claims, 5 Drawing Sheets

U.S. PATENT DOCUMENTS

| | | |
|---|---|---|
| 7,010,808 B1 * | 3/2006 | Leung et al. .................. 726/26 |
| 2002/0157002 A1 | 10/2002 | Messerges et al. |
| 2003/0076955 A1 | 4/2003 | Alve et al. |
| 2004/0088541 A1 * | 5/2004 | Messerges et al. .......... 713/156 |
| 2004/0103312 A1 * | 5/2004 | Messerges et al. .......... 713/201 |
| 2005/0071663 A1 * | 3/2005 | Medvinsky et al. ......... 713/200 |
| 2005/0210261 A1 * | 9/2005 | Kamperman et al. ........ 713/182 |
| 2005/0246777 A1 * | 11/2005 | Fontijn et al. ................. 726/27 |
| 2006/0123485 A1 * | 6/2006 | Williams ...................... 726/27 |

FOREIGN PATENT DOCUMENTS

| | | |
|---|---|---|
| WO | 03009536 A1 | 1/2003 |
| WO | 2005010879 A2 | 2/2005 |

* cited by examiner

CONNECTION LINKED RIGHTS PROTECTION

The present invention relates to a method and a system for performing digital rights management.

In recent years, the number of content protection systems available has been growing rapidly. Some of these systems only protect the content against illegal copying, while others also prohibit the user to access the content. The first category is called Copy Protection (CP) systems. CP systems have traditionally been the main focus for consumer electronics (CE) devices, as this type of content protection is thought to be inexpensively implemented and does not need bi-directional interaction with the content provider. Some examples are the Content Scrambling System (CSS), the protection system of DVD ROM discs and DTCP and the protection system for IEEE 1394 connections. The second category is known under several names. In the broadcast world, systems of this category are generally known as conditional access (CA) systems, while in the Internet world they are generally known as Digital Rights Management (DRM) systems.

A home network typically includes a number of devices, e.g. a radio receiver, a tuner/decoder, a CD player, a television, a VCR, etc. One device, such as a set top box, a PC or a home media server, is usually the central device in the network and content, e.g. music, movies, pictures, books etc, is received through the set top box. Content could also enter the home via other sources, such as storage media as discs or using portable devices. The source could be a connection to a broadband cable network, an Internet connection, a satellite downlink and so on. It is important to ensure that devices in the home network do not make unauthorised copies of content. Still, to attract users to the idea of home networks, it should be possible for the users to distribute content rather freely within the network.

The concept of Authorised Domains (ADs) tries to find a solution to both serve the interests of the content owners (who want protection of their copyrights) and the content consumers (who want to be allowed unrestricted content use). The main aim of an AD is to respect both the interests of the content owners (and/or content providers) and the content consumers, in the sense that the consumer is free to access and distribute content within the entire AD, while at the same time the rights of the content owners and providers are covered by imposing strict import and export rules to prevent unlimited digital copying of the content and content distribution across domains.

The basic principle is to have a controlled network environment in which content can be used relatively freely as long as it does not cross the border of the authorised domain. Typically, authorised domains are centered around the home environment, also referred to as home networks. Of course, other scenarios are also possible. A user could, for example, take a portable television with him on a trip and use it in his hotel room to access content stored on his Personal Video Recorder at home. Even though the portable television is outside the home network, it is a part of the user's authorised domain.

Consumers expect that they can import rights (and content) to the domain and also distribute them to others. Rights include e.g. play rights, one-generation copy rights, distribution rights etc. The main concern of content providers is to prevent illegal Internet redistribution, use and copying of rights (and content). Therefore they require strong limitations on rights and content exchange between ADs. It further is required that DRM and Pay-TV systems can distribute content to ADs and can connect to ADs. To achieve this, the architecture of an AD DRM resembles existing DRM architectures, meaning that access to content is controlled by digital rights. Consequently, an AD can be defined as an environment of (networked) devices, media, rights and users in which users and devices handle content according to accompanying rights. The network technologies employed may include e.g. Ethernet, IEEE 1394, BlueTooth, 802.11b etc.

In an AD, typically one device will perform AD device management (ADDM), while all devices will perform rights management (RM), i.e. are able to process and evaluate rights. The tasks of the ADDM typically involves device/right registration (add a device/right to an authorised domain) and device/right deregistration (remove a device/right from an authorised domain). The protection of rights and/or content usually involves cryptographic operations.

For example, during device registration, the device to be registered will obtain an AD key or AD identifier, if all conditions are fulfilled. The minimum required conditions are that the device is compliant and that the domain size stays within certain limitations. These conditions will be enforced by the ADDM. Note that it is also possible to have person based ADs instead of device based ADs. The person based ADs functions in an analogous manner. Alternatively, hybrid ADs can be implemented, i.e. the ADs are based on a combination of persons/devices. An AD functioning in accordance with the information furnished above is described in the paper "Secure content management in authorised domains", by S. A. F. A. van den Heuvel, W. Jonker, F. L. A. J. Kamperman, and P. J. Lenoir, IBC Conference Publication, pp. 467-474, September, 2002.

Various systems already are proposed that implement the concept of authorised domains to some extent. Examples of such systems are SmartRight, xCP and NetDRM.

A home media network is described in WO 03/009536 A1. The home media network described includes a first device configured to acquire and store digital media content, a transmission medium coupled to the first device and a second device coupled to the transmission medium. The second device is configured to determine that a first network user is requesting access to digital media content based upon a first remote identification corresponding to the user. WO 03/009536 A1 further describes that the network can comprise a storage management module that protects sensitive material and ensures that copyright and usage rules dictated by the media creator or distributor are obeyed. Moreover, the module can be employed to enforce business rules and DRM. The storage management module in the form of a set-top box is implemented to acquire and store digital content.

A problem with WO 03/009536 A1 is the inflexibility associated with the use of the storage management module, since all distribution of content to home media devices in the network are managed by, and passes trough, the module. Typically, the content also enters the network via the module and the module constitutes the interface to other networks. Another problem is that content to be accessed by the home media devices are typically stored on the module and not on the multiple home media devices, which possibly are connected to the module via radio frequency, included in the network. When a device wants to access content, the content must be retrieved from the module.

Generally, problems in the prior art concern issues related to the fact that the management of digital content and associated digital rights is built around a device such as a device manager or a storage management module. These devices have the drawback that they are typically rather fixed and inflexible. Another general problem is that the domains/networks cannot easily be changed or reconfigured as these fixed devices act as network administrators. As a consequence, the size of the AD is fixed for all content entering the AD, since this is determined centrally by the device manager/storage management module.

An object of the present invention is to solve the above given problems and to offer smooth and flexible distribution and management of digital content and associated digital rights among devices comprised in a network. Another object of the invention is to distribute and manage digital rights that are not bound to certain devices, or users of the devices, in the network. Yet another object of the invention is to provide a solution wherein the size of the AD can differ for differing content.

These objects are achieved by a method for performing digital right management in a network according to claim 1 and a system for performing digital right management according to claim 12. Preferred embodiments are defined by the dependent claims.

According to a first aspect of the invention, a method is provided in which a master right associated with a content is stored in a first authorised device, which master right controls what type of access the first authorised device has to the associated content. Subsequently, a subright is derived from the master right, which subright controls what type of access a second authorised device is given to the associated content. Then, the subright is distributed to the second authorised device, given that said second device complies with predetermined distribution criteria associated with the master right.

According to a second aspect of the invention, a system is provided which comprises a first and a second authorised device and a master right associated with an item of content. The first authorised device stores the master right associated with a content item, derives a subright from the master right and distributes the subright to the second authorised device, given that the second device complies with predetermined distribution criteria associated with the master right. Further, the master right controls what type of access the first authorised device has to the associated content and the subright controls what type of access the second authorised device has to the associated content.

The basic idea of the invention is that first, a master right associated with a content item is stored at a first authorised device. For example, a user of the device logs on to the site of a content provider. Using her credit card, she buys the right to access content in the form of e.g. a song and downloads the digital right to the device, being for example a portable audio player such as an MP3 player. Different types of accesses exist, for example "play", "copy", "burn to CD-R", "transfer", "download" etc. A typical digital right associated with audio content is "play unlimited" and in the following, this is the type of access that will be discussed. From the content provider, the user can download the actual song with which the play unlimited right is associated. However, she might already have downloaded the song to her audio player, possibly from another site, or the song might reside on some other type of device to which she has access. The actual commodity is not the content in itself, but the digital right to access it. An authorised device is a device that can be considered trusted and performs actions with contents according to the associated rights which have been defined by content owners. The authorised devices are responsible for enforcing rights that are bound to content items, and perform the security tasks of the underlying DRM system being employed. Thus, when downloading the digital right to the audio player, the content provider authenticates the player by means of cryptographic operations to verify that the player is compliant, i.e. that it can be considered to be trusted.

Thereafter, a subright is derived from the master right, which subright controls what type of access a second authorised device is given to the associated content. Assuming that the user wants to be able to play the song on some other authorised device, for example her stationary stereo equipment; this will not harm the content provider, as the right stays within the possession of the user or possibly a family member of the user. It is then possible to derive a "play unlimited" subright from the master right. The actual deriving of the subright can be done at any authorised device which at the moment holds the master right, or which is requested by the device holding the right to derive a subright. Hereinafter, the authorised device presently holding the master right will be referred to as the "first authorised device". The content may be copied in the first device and distributed to the second device, but as previously mentioned, the distribution of the content might be effected in many other ways. Possibly, the second device has already stored a copy of the content.

Finally, the subright is distributed to the second authorised device, i.e. the stationary stereo equipment, given that the second device complies with predetermined distribution criteria associated with the master right. These distribution criteria can be formulated in a number of different ways. For example, the master right describes the type of devices on which the content may be accessed, the number of devices that are allowed to access the content, a period of time during which the content can be accessed, the distance between the location of the first device and the second device must not exceed a preset maximum distance etc. The device distributing the subright must perform an authentication operation on the device receiving the subright, ensuring that the second device can be trusted.

The present invention is advantageous, since the domain in which digital content and associated digital rights can be distributed is not built around a device such as a device manager or a storage management module, as in the prior art. First, devices such as a device manager or a storage management module are typically rather fixed and inflexible devices. Second, the content are typically stored on these fixed devices and not, as in the present invention, present on multiple devices. Third, the domain cannot easily be changed using these fixed devices, whereas in the present invention, the domain can be changed with the master right (or master rights). This has the effect that the domain can be set on the basis of a master right and an associated piece of content, and that it thus can be set for every content item individually. The master right can easily "change hands" and be moved from one authorised device to another, wherein the domain changes constantly. Thus, the master right itself sets the domain for distribution as well as the conditions for distributing subrights. This brings flexibility to a network, as the master right easily can be moved between authorised devices. This also has the effect that the created domain is managed by the master right itself in association with the device presently holding the master right.

According to an embodiment of the invention, a predetermined distribution criterion is that the distance between the first authorised device and the second authorised device is smaller than a maximum distribution distance. An authenticated measurement will be performed of the distance between the first device holding the master right and the second device to which the subright is to be distributed. The maximum distribution distance has to be agreed upon by the content provider and the user. An exemplifying maximum distribution distance might be 100 m.

This embodiment is advantageous, since the physical range of the domain in which the digital rights distribution can take place, e.g. a home network or an authorised domain, is not predetermined, but can be set in accordance with the master right. For example, it should be possible for the user to visit her neighbor, and thereby leave the home network, and bring her audio player to which a subright later can be distributed given that the distance to the neighbor is less than the maximum distribution distance. When the subright is distributed, she can play the associated content on her audio player at her neighbor's home.

According to another embodiment of the invention, when the second authorised device wants to access the subright and the associated content, an authenticated measurement of the distance between the first device holding the master right and the second device holding the subright will be performed. If the distance between the two devices is smaller than a maximum access distance, the second device will be given access to the subright and the associated content. The maximum access distance has to be agreed upon by the content provider and the user. An exemplifying maximum access distance might be 100 m.

This embodiment is advantageous, since even if a second device has been given a subright, the device cannot move unrestrictedly and still be able to exercise the subright and the associated content. Assuming that the user brings the audio device to a first neighbor and a subright is distributed, or previously has been distributed, to the audio player, it is not necessarily possible for the user to leave the first neighbor and bring her audio device to a second neighbor, the second neighbor being located on a larger distance from the first device than the first neighbor, and still be able to exercise the subright and access the associated content. If the distance exceeds the maximum access distance, the subright will not give the second device access to the content.

According to yet another embodiment of the invention, the subrights derived from the master right will be revoked when the master right exits the network. The master right can exit the network in a number of different ways. For example, the device holding the master right can simply discard or delete the master right, whereby the master right can be said to have exited the network. Another way for the master right to exit the network is that the device holding the master right transfers it to another authorised device which is not part of the AD, but which device belongs to another AD. The devices which hold subrights derived from said master right cannot be authenticated with this authorized device, as it is not part of the same AD. This means that the devices, or at least a part of the devices, which holds the subrights derived from the master right in question are not compliant with the device to which the master right is transferred, i.e. they do not pass the authentication procedure. A way to perform the revocation is to have the first device contact all the devices which has a subright derived from the master right held by the first device, and thereby make the subrights void. Thereafter, the first device can dispatch the master right from the network.

According to a further embodiment of the present invention, a predetermined distribution criterion is that the number of authorised devices or persons that are allowed in the authorised domain shall be smaller than a maximum domain participant number. The maximum domain participant number has to be agreed upon by the content provider and the user. An exemplifying maximum domain participant number might be 10 devices or persons. This embodiment has the advantage that it is rather easy to control the actual size of the authorised domain. It may be desirable for a content provider to limit the number of possible participants in the domain, as the provider wants to control the number of copies of a given content (or actually the rights to render the content).

According to another embodiment of the invention, a content quality parameter is set in the subright, which parameter decides the quality with which said associated content can be rendered by the second authorised device. A user can share content and associated subrights, which decide the quality with which the content can be rendered, with other users comprised in the personal area network, or PAN. A PAN can be considered to be a form of AD. This has the advantage that the same content can be distributed, but different subrights can be derived for different content qualities. A low-quality rendering normally implies a rendering with more noise or a shortened version of the content. This is a feature directed towards superdistribution, and if the users pay a fee to the content provider, this content can be given full-quality status, which means that a new master right is created following payment.

According to further embodiments of the invention, the control of the type of access to the associated content that a second authorised device is given by a subright, and the predetermined distribution criteria associated with the master right, are set by the service provider. This is expedient for the service provider, since access and distribution criteria can be set by the provider, and consequently the provider does not have to trust the device to which the master right is distributed to the same extent.

Alternatively, the control of the type of access that a second authorised device is given to said associated content by a subright, and the predetermined distribution criteria associated with the master right, are set by the first authorised device. This is expedient for the content consumer, since it gives the consumer a larger degree of freedom in handling and distributing the contents and rights. DRM is sometimes experienced as restrictive to the content consumers. For content consumers to accept DRM, tools such as the present invention must be as smooth as possible to use when implemented in DRM systems.

Possibly, in accordance with another embodiment of the present invention, the second authorised device must contact the first authorised device, which stores the master right before exercising the subright. This is a strict criterion that brings a great measure of security to the invention.

Further features of, and advantages with, the present invention will become apparent when studying the appended claims and the following description. Those skilled in the art realize that different features of the present invention can be combined to create embodiments other than those described in the following.

The present invention will be described in detail with reference made to the accompanying drawings, in which.

Figure 1:
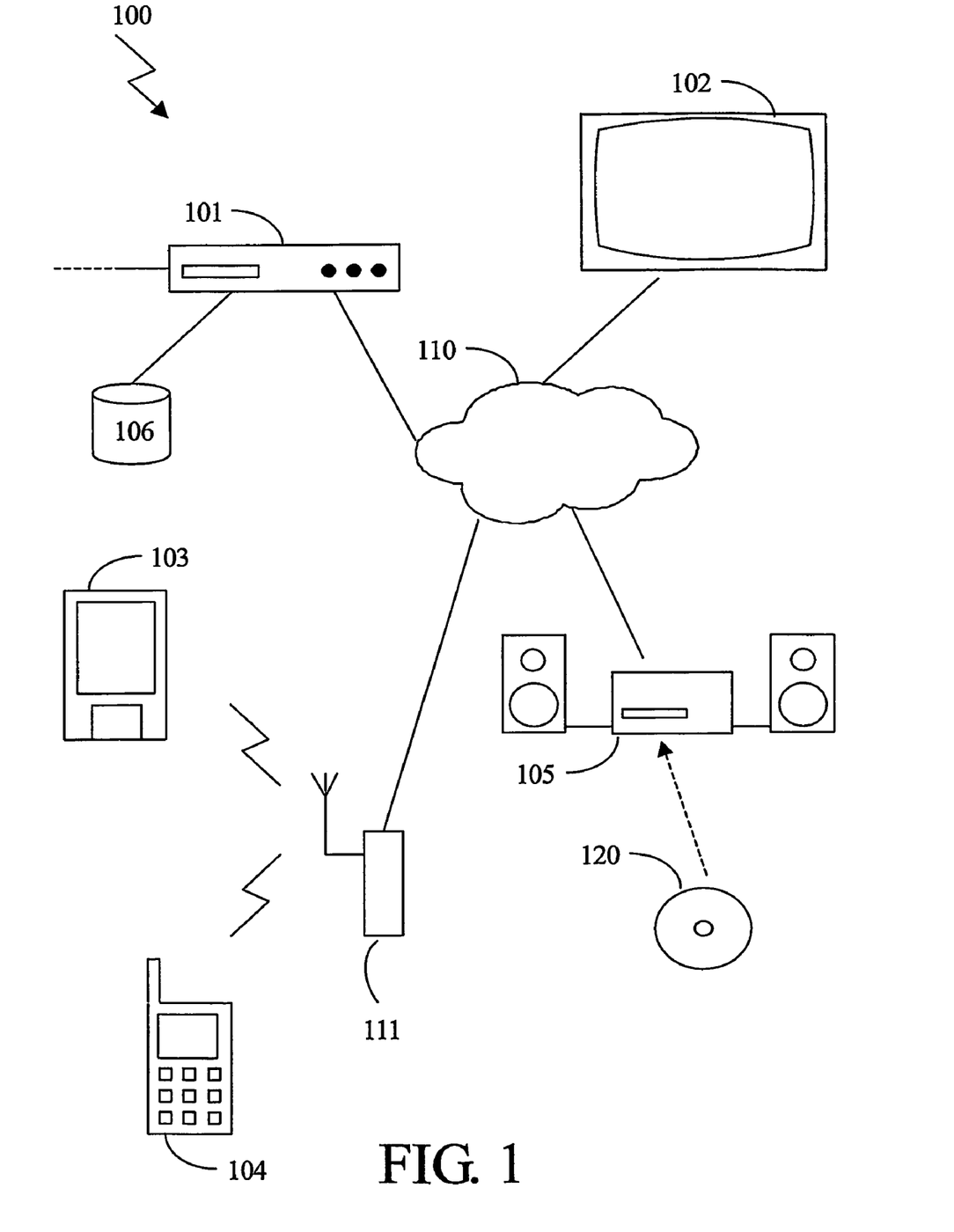
FIG. 1 schematically shows a prior art system comprising devices interconnected via a network, in which system the present invention advantageously can be applied.

FIG. 1 schematically shows a prior art system 100 comprising devices 101-105 interconnected via a network 110, in which the present invention can be applied. In this example, the system 100 is an in-home network. A typical digital home network includes a number of devices, e.g. a radio receiver, a tuner/decoder, a CD player, a pair of speakers, a television, a VCR, a tape deck, and so on. These devices are usually interconnected to allow one device, e.g. the television, to control another, e.g. the VCR. One device, such as e.g. the tuner/decoder or a set top box (STB), is usually the central device in the network.

Content, which typically comprises things like music, songs, movies, TV programs, pictures, books and the likes, but which also includes interactive services and computer code such as games, is received through a residential gateway or set top box 101. Content could also enter the home via other sources, such as storage media like discs or using portable devices. The source could be a connection to a broadband cable network, an Internet connection, a satellite downlink and so on. The content can then be transferred over the network 110 to a sink for rendering. A sink can be, for instance, the television display 102, the portable display device 103, the mobile phone 104 and/or the audio playback device 105.

The exact way in which a content item is rendered depends on the type of device and the type of content. For instance, in a radio receiver, rendering comprises generating audio signals and feeding them to loudspeakers. For a television receiver, rendering generally comprises generating audio and video signals and feeding those to a display screen and loudspeakers. For other types of content a similar appropriate action must be taken. Rendering may also include operations such as decrypting or descrambling a received signal, synchronizing audio and video signals and so on.

The set top box 101, or any other device in the system 100, may comprise a storage medium 106 such as a suitably large hard disk, allowing the recording and later playback of received content. The storage medium 106 could be a Personal Digital Recorder (PDR) of some kind, for example a DVD+RW recorder, to which the set top box 101 is connected. Content can also enter the system 100 stored on a carrier 120 such as a Compact Disc (CD) or Digital Versatile Disc (DVD).

The portable display device 103 and the mobile phone 104 are connected wirelessly to the network 110 using a base station 111, for example using BlueTooth or IEEE 802.11b. The other devices are connected using a conventional wired connection. To allow the devices 101-105 to interact, several interoperability standards are available, which allow different devices to exchange messages and information and to control each other. One well-known standard is the Universal Plug and Play (UPnP) standard. Other well-known standards are the domestic digital bus (D2B) standard, a communications protocol described in IEC 1030 and Universal Plug and Play.

It is important to ensure that the devices 101-105 in the home network do not make unauthorised copies of the content. To do this, a security framework such as a DRM system is necessary. All devices in the in-home network that implement the security framework do so in accordance with the implementation requirements. Using this framework, these devices can authenticate each other and distribute content securely. Access to the content is managed by the security system. This prevents the unprotected content from leaking "in the clear" to unauthorised devices and data originating from untrusted devices from entering the system.

It is important that devices only distribute content to other devices that they have successfully authenticated beforehand to determine if they are compliant and/or belong to the same AD. This ensures that an adversary cannot make unauthorised copies using a malicious device. A device will only be able to successfully authenticate itself if it was built by an authorised manufacturer, for example because only authorised manufacturers know a particular secret necessary for successful authentication or their devices are provided with a certificate issued by a Trusted Third Party.

Figure 2:
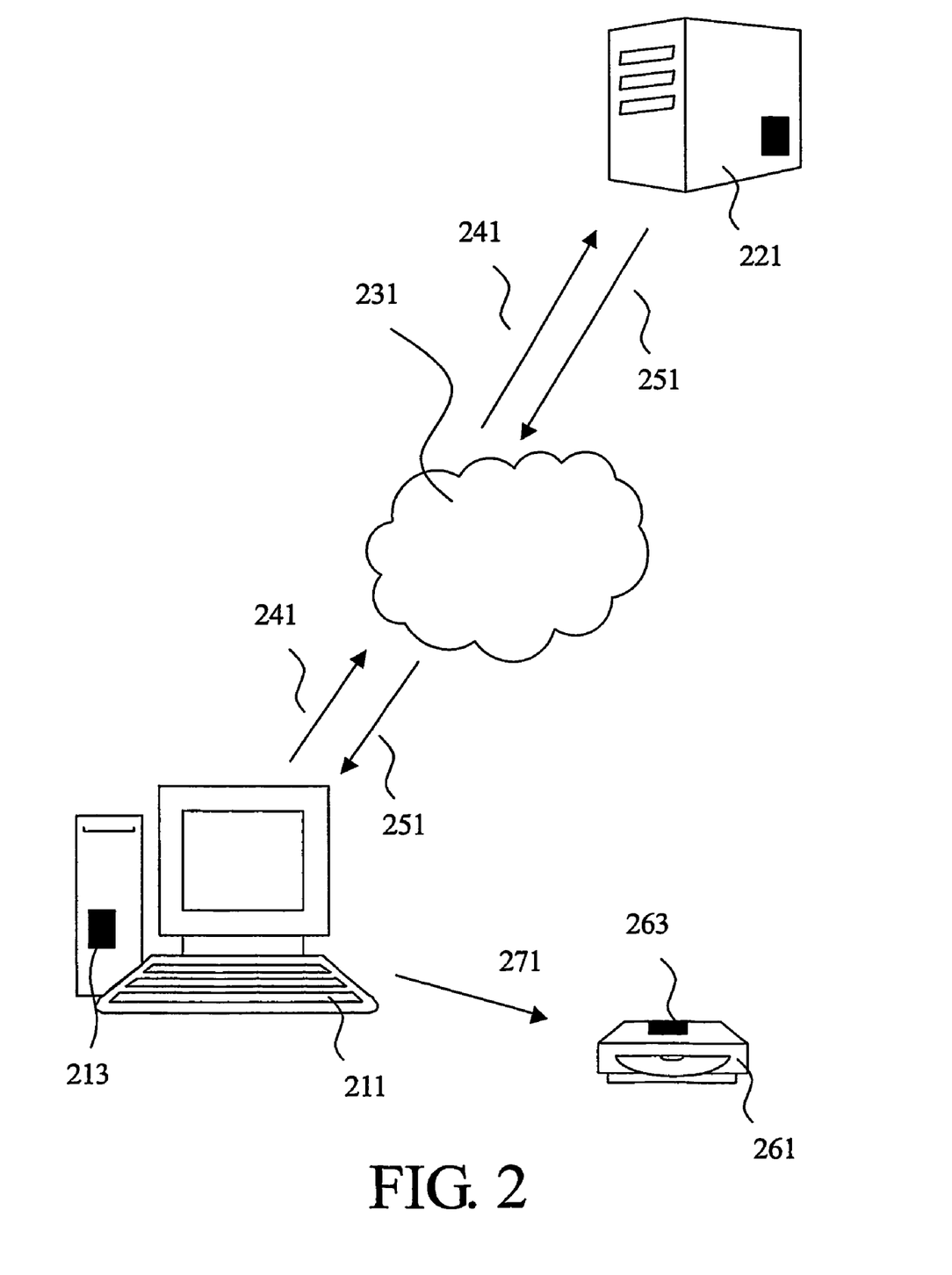
FIG. 2 shows a schematic view of a system according to an embodiment of the present invention.

FIG. 2 shows a schematic view of a system according to an embodiment of the present invention. A content consumer at a first authorised device 211 logs on 241 to the site of a content provider 221 via the Internet 231 or some other appropriate network. Using her credit card, she buys a master right ("play unlimited") to access an associated content in the form of e.g. a song and downloads and stores 251 the digital master right in the first authorised device 211, being for example a computer (as shown in FIG. 2), a portable audio player such as an MP3 player, a DVD player etc. The content consumer might also download the actual song, with which the master right is associated, from the content provider. The term "authorised device" denotes that when downloading the master right to the computer, the content provider authenticates the player by means of cryptographic operations.

Note that it is possible that authentication may occur between any two, or more, of the devices between which communication takes place in the described embodiments. This would require the distributed information to be provided with some identifier or authenticator, for example in the form of an identification number or by means of (symmetric key) encryption or by providing a digital signature. Authentication is typically used to improve the security in a system. Optionally, information is encrypted to prevent unauthorised third parties from eavesdropping on the network and accessing/stealing the distributed information. Exactly which security measures must be taken by a security system is a trade-off between the cost of implementing the security facilities and the risk that the proprietor of the copyrighted content and/or the content provider will be harmed or the consequence thereof.

Thereafter, a subright is derived from the master right at the first authorised device 211. The subright controls what type of access a second authorised device 261, e.g. a portable combined CD/MP3 player, is given to the associated content. In this case a play unlimited subright is derived. The content may be copied in the first device 211 and distributed 271 to the second device 261, as previously mentioned. However, the distribution of the content might be effected in many other ways. Possibly, the second device has already stored a copy of the content.

The subright is distributed to the second authorised device 261, given that the second device complies with a predetermined distribution criterion associated with the master right. Again, the device 211 distributing the subright must perform an authentication operation on the device 261 receiving the subright, ensuring that the second device can be trusted. In its simplest form, the predetermined distribution criterion to be complied with is that the device to which the subright is distributed is considered trusted, i.e. that the first device authenticates the second device.

Note that the subright may be copy protected before it is distributed to the second authorised device. Alternatively, it is in an appropriate manner specified in the subright that it cannot be copied. This has the advantage that the subright cannot be copied and distributed in great numbers in case the second authorised device is a malicious device which has managed to pass the authentication procedure. Subsequent authorised devices will not accept a subright that is copy protected from a device not holding the master right.

As can be seen from FIG. 2, the master right itself sets the domain for distribution as well as the conditions for distributing subrights. The master right can easily be transferred from one authorised device to another, wherein the domain changes constantly, since the master right itself can be seen as forming the "center" of the domain. Thus, the master right determines which device acts as a domain manager for the corresponding piece of content. The device that at the moment holds the master right can be considered to be the domain manager.

Turning again to FIG. 2 the control of the type of access that a second authorised device 261 is given to said associated content by a subright, and the predetermined distribution criteria associated with the master right, can be set by the first authorised device 211. However, the control of the type of access that a second authorised device is given to the associated content by a subright, and the predetermined distribution criteria associated with the master right, can alternatively be set by the service provider 221. The former scenario is expedient for the content consumer, since it gives the consumer a larger degree of freedom in handling and distributing the contents and rights. The latter scenario, on the other hand, is expedient for the service provider, since access and distribution criteria can be set by the provider, and consequently the provider does not have to trust the device to which the master right is distributed to the same extent.

The devices of the present invention comprise processing means 213, 263 in the form of CPUs, ASICs or other appropriate processing means and associated storing means such as RAMs, ROMs, EEPROMs etc. for storing program code and variables executed by the processing means.

Figure 3:
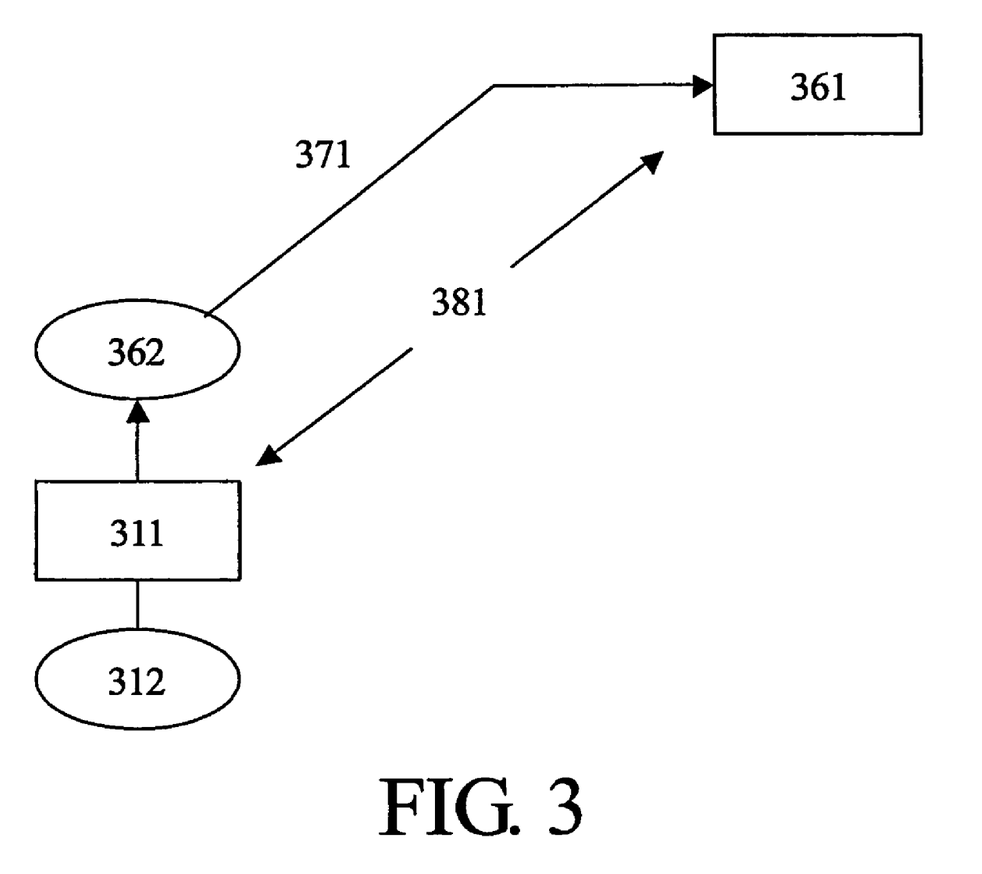
FIG. 3 illustrates the effect of a predetermined distribution criterion according to an embodiment of the invention.

With reference made to FIG. 3, the predetermined distribution criterion is, according to one embodiment of the invention, that the distance 381 between the first authorised device 311 and the second authorised device 361 is smaller than a maximum distribution distance of, say 20 m. An authenticated measurement is performed of the distance 381 between the first device 311 holding the master right 312 and the second device 361 to which the subright 362 is to be distributed 371. If the distance between the first device and the second device is more than 20 m, the subright will not be distributed. This makes it very clear that the size of a domain is set by the master right.

The authenticated measurement can be performed in a number of different ways. The preferred way to do it in the present invention is described in PHNL020681EPP, to which reference is made. A first signal is transmitted from a first communication device to a second communication device at a first time t1. The second device receives the first signal and generates a second signal by modifying the received first signal according to some secret shared by the first and the second device. The second signal is then sent to the first device, which receives the second signal at a second time t2. The first device checks if the second signal has been modified according to the common secret. This way, the first device knows that the second signal originates from the second device and not from any third communication device that does not know the common secret. The distance is determined based on the time difference between t1 and t2.

Figure 4:
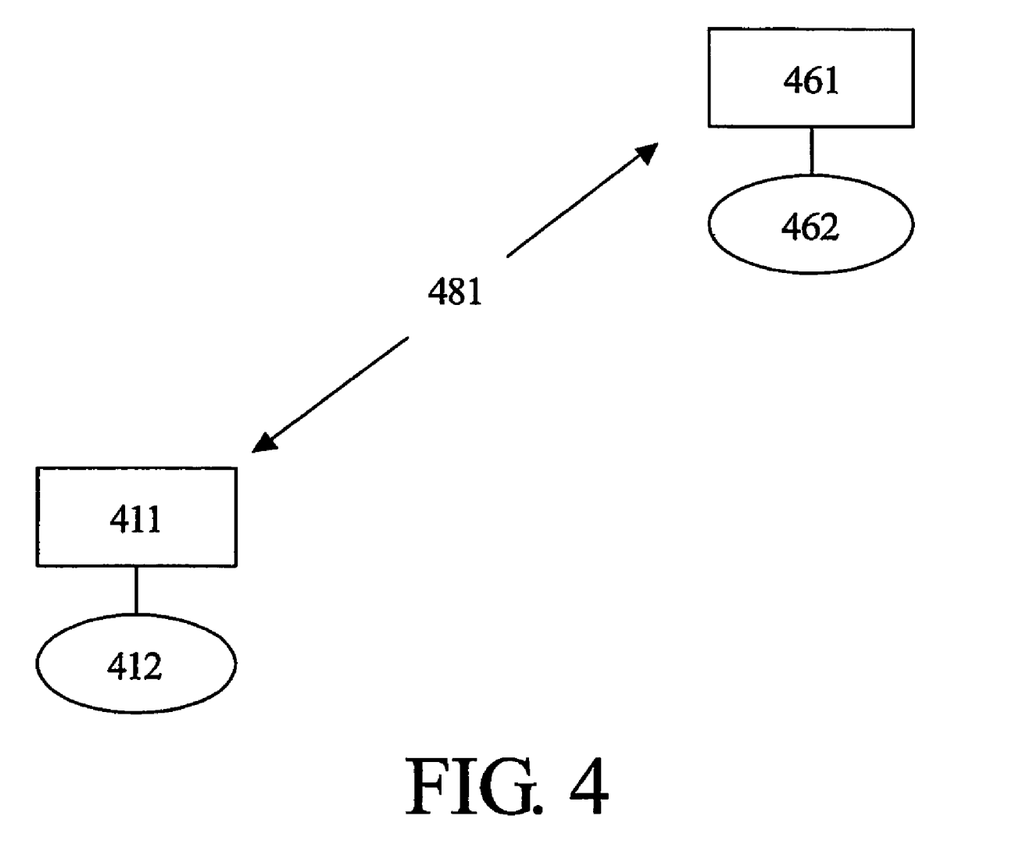
FIG. 4 illustrates the effect of a predetermined access criterion according to an embodiment of the invention.

With reference made to FIG. 4, when the second authorised device 461 wants to exercise the subright 462 and the associated content, an authenticated measurement of the distance 481 between the first device 411 holding the master right 412 and the second device 461 holding the subright 462 will be performed. If the distance 481 between the two devices is smaller than a maximum access distance, say 40 m, the second device will exercise the subright and be given access to the associated content. This again makes it clear that the size of a domain is set by the master right. It also shows that not only a distribution criterion might be set, but also an access criterion.

Note that even though, for reasons of simplicity, only one "second authorised device" is shown throughout FIGS. 2-4, in reality a plurality of second authorised devices are comprised in a domain, as can be seen in FIG. 1.

According to another embodiment of the invention, the authenticated distance measurement as described hereinabove is performed, but this time the second device will only be able to exercise the subright and thereby be given access to the associated content if the distance between the two devices does not exceed a maximum access distance of e.g. 10 m. This is advantageous, since a personal area network (PAN) can be created. A PAN is defined as an interconnection of information technology devices that are positioned on a maximum distance from an individual person or a central device comprised in the PAN, typically within a range of 10 meters from the central device. For example, a person traveling with a laptop, a personal digital assistant (PDA) and a portable printer could interconnect these devices without having to plug anything in, using some form of wireless technology. Typically, this kind of personal area network could also be created by means of interconnection without wires, to the Internet or other networks. Alternative technologies are Bluetooth, IrDA, SWAP (Shared Wireless Access Protocol) and OpenAir. Below is a scenario described in which a PAN is a suitable solution.

A user has content in the form of songs, movies or other data stored on a portable device such as a laptop. The content can be stored on the hard disc of the laptop or e.g. on a removably arranged Small Form Factor Optical (SFFO) disc, which is a portable, low-cost, high-storage capacity disc. The portable device (and thus the SFFO) is tucked away in the user's bag located in the stowage compartment of the motor coach in which he is traveling. The user also has a portable audio player at hand. The portable audio player can request by means of user operation, via its wireless connection to the laptop, a subright from the laptop that holds the master right, and possibly also a copy of the content if the content is not already stored on the audio player. If the audio player can be authenticated by the laptop, i.e. the predetermined distribution criterion is complied with, a subright is derived from the master right and the audio player is provided with this subright. This subright gives the user the right to access the content. Possibly, the predetermined distribution criterion is somewhat stricter, such that the subright is only distributed if the distance between the laptop and the audio player does not exceed a maximum distribution distance.

When the user wants the audio player to exercise the subright and render the associated content, i.e. when the user pushes the "play" button, an authenticated measurement of the distance between the player (which holds the subright) and the laptop (which holds the master right) is performed. If the distance between the two devices is smaller than a maximum access distance of e.g. 10 m, the player is free to exercise the subright and thus be given access to the associated content. This has the effect that all authenticated devices within a 10 m range from the device holding the master right, in this case a laptop, are comprised in the PAN and can be given subrights to exercise with the intention to render content.

In accordance with another embodiment of the invention, a user can share content and associated subrights with other users comprised in the PAN, e.g. give them a sample, such as an abridged version of the original content or a low quality version, which can only be rendered if the master right is located within a given distance. This is allowed by the content provider for advertisement purposes and should not violate the copyright of the content creator. Preferably, the quality with which the content is to be rendered is set in the subright. This has the advantage that the same content can be distributed, but different subrights can be derived for different content qualities. A low-quality rendering normally implies a rendering with more noise, a shortened version of the content or with an intermixed advertisement. If the users pay a fee to the content provider, this content can be given full-quality status using a very low bandwidth connection.

Figure 5:
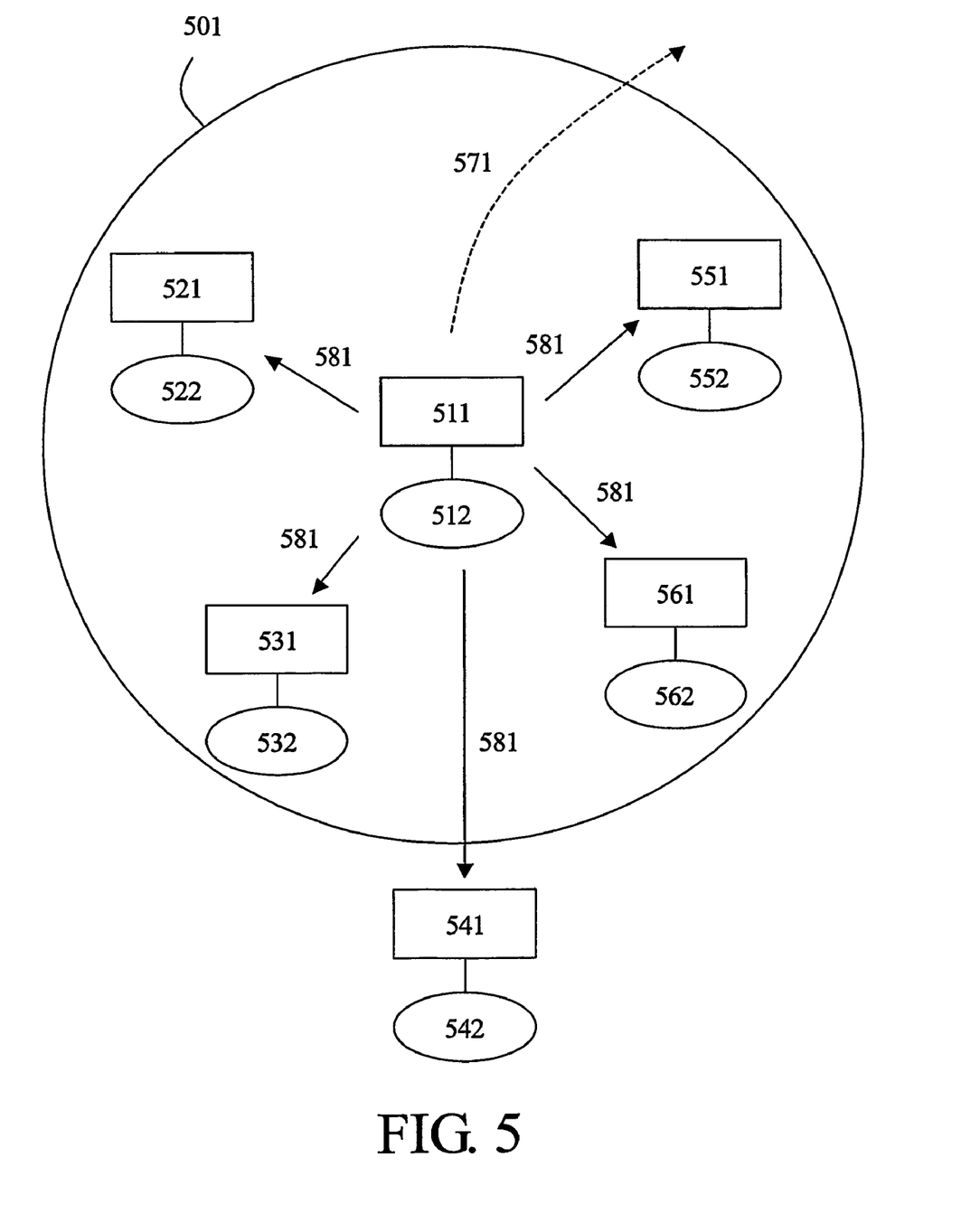
FIG. 5 illustrates the revocation of subrights derived from the master right, when the master right exits the domain, according to an embodiment of the invention.

In FIG. 5, it is illustrated that when the master right 512 exits 571 the domain 501, the subrights 522, 532, 542, 552, 562 derived from the master right 512 will be revoked 581. As mentioned in the following, the master right can exit the domain in many different ways. The device holding the master right can discard or delete the master right, the device holding the master right can transfer it to another authorised device with which devices holding subrights derived from the master right cannot be authenticated. This suggests that the devices which hold the subrights derived from the master right in question are not compliant with the device to which the master right is transferred, or do not belong to the same domain. A way to perform the revocation is to have the first device 511 contact all the devices 521, 531, 541, 551, 561 that have a subright derived from the master right held by the first device, and thereby make the subrights void by removing them from each respective device. Thereafter, the first device can dispatch the master right from the network.

In connection with FIG. 5, it is also illustrated that a predetermined distribution criterion can be that the number of authorised devices or persons that are allowed in the authorised domain shall be smaller than a maximum domain participant number. In this case, six devices 511, 521, 531, 541, 551, 561 are comprised in the domain 501. Under assumption that the maximum domain participant number is set to 6, another device will not be accorded a subright, and will thereby not be included in the domain.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method for performing digital right management in a network, the method comprising:
   storing, in a first authorized device, a master right associated with a content, which master right controls what type of access the first authorized device has to the associated content;
   deriving a subright from the master right, which subright controls what type of access a second authorized device is given to the associated content;
   distributing the subright to the second authorized device, if it is determined by at least the first authorized device that the second authorized device complies with a predetermined distribution criterion associated with the master right;
   measuring a distance between the first authorized device and the second authorized device, and
   allowing, by means of exercising the subright, the second authorized device access to the associated content if the distance between the first authorized device and the second authorized device is smaller than a maximum access distance.

2. The method of claim 1, wherein the predetermined distribution criterion is that the distance between the first authorized device and the second authorized device shall be smaller than a maximum distribution distance.

3. A method for performing digital right management in a network, the method comprising:
   storing, in a first authorized device, a master right associated with a content, which master right controls what type of access the first authorized device has to the associated content;
   deriving a subright from the master right, which subright controls what type of access a second authorized device is given to the associated content;
   distributing the subright to the second authorized device, given that the second authorized device complies with a predetermined distribution criterion associated with the master right;
   measuring a distance between the first authorized device and the second authorized device,
   allowing, by means of exercising the subright, the second authorized device access to the associated content if the distance between the first authorized device and the second authorized device is smaller than a maximum access distance; and
   revoking the subright at the second authorized device when the master right exits the network.

4. The method of claim 3, wherein the first authorized device and the second authorized device are included in an authorized domain, and the size of the authorized domain is managed by the master right.

5. The method of claim 4, wherein the first authorized device manages the authorized domain.

6. The method of claim 4, wherein the predetermined distribution criterion is that the number of authorized devices or persons which are allowed in the authorized domain shall be smaller than a maximum domain participant number.

7. The method of claim 1, wherein the control of the type of access that a second authorized device is given to the associated content by a subright, and the predetermined distribution criteria associated with the master right, are set by a service provider.

8. A method for performing digital right management in a network, the method comprising:
   storing, in a first authorized device, a master right associated with a content, which master right controls what type of access the first authorized device has to the associated content;
   deriving a subright from the master right, which subright controls what type of access a second authorized device is given to the associated content;
   distributing the subright to the second authorized device, given that the second authorized device complies with a predetermined distribution criterion associated with the master right,
   wherein the control of the type of access that the second authorized device is given to the associated content by the subright is set by the first authorized device;
   measuring a distance between the first authorized device and the second authorized device, and
   allowing, by means of exercising the subright, the second authorized device access to the associated content if the distance between the first authorized device and the second authorized device is smaller than a maximum access distance.

9. A method for performing digital right management in a network, the method comprising:
   storing, in a first authorized device, a master right associated with a content, which master right controls what type of access the first authorized device has to the associated content;
   deriving a subright from the master right, which subright controls what type of access a second authorized device is given to the associated content;
   distributing the subright to the second authorized device, given that the second authorized device complies with a predetermined distribution criterion associated with the master right;
   receiving a contact from the second authorized device before exercising the subright by the second authorized device;

measuring a distance between the first authorized device and the second authorized device; and allowing, by means of exercising the subright, the second authorized device access to the associated content if the distance between the first authorized device and the second authorized device is smaller than a maximum access distance.

10. The method of claim 9, including verifying the master right before exercising the subright by the second authorized device.

11. The method of claim 9, including contacting the first authorized device before each exercising of the subright by the second authorized device.

12. The method of claim 11, including verifying that the first authorized device is within a given range of the second authorized device.

13. The method of claim 3, wherein the master right exits the network whenever the first authorized device transfers the master right to another device outside the network.

14. The method of claim 3, wherein the master right exits the network whenever the master right is revoked at the first authorized device.

15. The method of claim 3, wherein revoking the subright is effected via a communication from the first authorized device to the second authorized device.

16. The method of claim 1, wherein determining the distance includes communicating a first signal from the first authorized device at a first time, receiving a second signal from the second authorized device in response to the first signal at a second time, and determining a difference between the first and second times.

17. The method of claim 16, wherein the second signal is based on the first signal and a secret shared by the first and second authorized device.

18. A device comprising:
a memory that is configured to store a master right that defines access rights of the device to content material, and
a processor that is configured to:
determine whether a second device is authorized to receive some or all of the access rights to the content material, based on a distribution right that is associated with the master right,
create a subright that defines the access rights of the second device,
determine a distance between the device and the second device, and
distribute the subright to the second device if the distance is less than a predefined maximum distribution distance.

19. The device of claim 18, wherein the maximum distribution distance is included in the distribution right.

20. The device of claim 18, wherein the subright grantable to the second device is defined by a provider of the master right.

21. The device of claim 18, wherein the subright grantable to the second device is defined by the device.

22. The device of claim 18, wherein the processor is configured to verify the master right to the second device upon request of the second device.

23. A device comprising:
a memory that is configured to store a subright that defines access rights of the device to content material based on a master right at an other device on a network, and
a processor that is configured to:
verify to the other device that the device is authorized to receive subrights to content materials,
transmit a response signal to a first signal that is received from the other device to facilitate determination, at the other device, of a distance between the device and the other device, the response signal being based on the first signal and a secret that is shared between the device and the other device,
receive the subright from the other device, and
exercise the subright to gain access to the content material.

24. The device of claim 23, wherein the processor is configured to contact the other device before exercising the subright.

25. The device of claim 24, wherein the processor is configured to contact the other device to verify the master right at the other device before exercising the subright.

26. The device of claim 25, wherein the processor is configured to verify the master right at the other device before each exercising of the subright.

27. The device of claim 24, wherein the processor is configured to contact the other device to verify that the other device is within a given range of the device before each exercising of the subright.

* * * * *